United States Patent
Whitehead

(10) Patent No.: US 7,522,732 B2
(45) Date of Patent: Apr. 21, 2009

(54) METHOD FOR CONTROLLING THE DISTRIBUTION OF SOFTWARE CODE UPDATES

(75) Inventor: David Harold Whitehead, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 806 days.

(21) Appl. No.: 10/984,049

(22) Filed: Nov. 9, 2004

(65) Prior Publication Data

US 2006/0101454 A1   May 11, 2006

(51) Int. Cl.
*H04L 9/00* (2006.01)
(52) U.S. Cl. .................. 380/286; 713/171
(58) Field of Classification Search ............... None
See application file for complete search history.

(56) References Cited

U.S. PATENT DOCUMENTS

| | | |
|---|---|---|
| 6,253,281 B1 | 6/2001 | Hall |
| 6,282,709 B1 | 8/2001 | Reha et al. |
| 6,347,398 B1 | 2/2002 | Parthasarathy et al. |
| 6,587,842 B1 | 7/2003 | Watts |
| 6,618,162 B1 | 9/2003 | Wiklof et al. |
| 6,640,334 B1 | 10/2003 | Rasmussen |
| 6,662,299 B1 | 12/2003 | Price, III |
| 2002/0038420 A1* | 3/2002 | Collins et al. ............ 713/156 |
| 2002/0087891 A1 | 7/2002 | Little et al. |
| 2002/0099940 A1 | 7/2002 | Wang |
| 2002/0104019 A1 | 8/2002 | Chatani et al. |
| 2002/0128975 A1 | 9/2002 | Klemba et al. |
| 2002/0199096 A1 | 12/2002 | Wenocur et al. |

\* cited by examiner

*Primary Examiner*—Brandon S Hoffman
(74) *Attorney, Agent, or Firm*—Michael Best & Friedrich, LLP

(57) ABSTRACT

A method is described for controlling the distribution of a software code update for an embedded software application on a device. The method includes the steps of assigning an asymmetric key pair to the software application and another asymmetric key pair to the sender of the software code update. The software code update is sent in a secure manner to one or more devices while preventing devices not possessing the appropriate keys from obtaining the software code update.

18 Claims, 2 Drawing Sheets

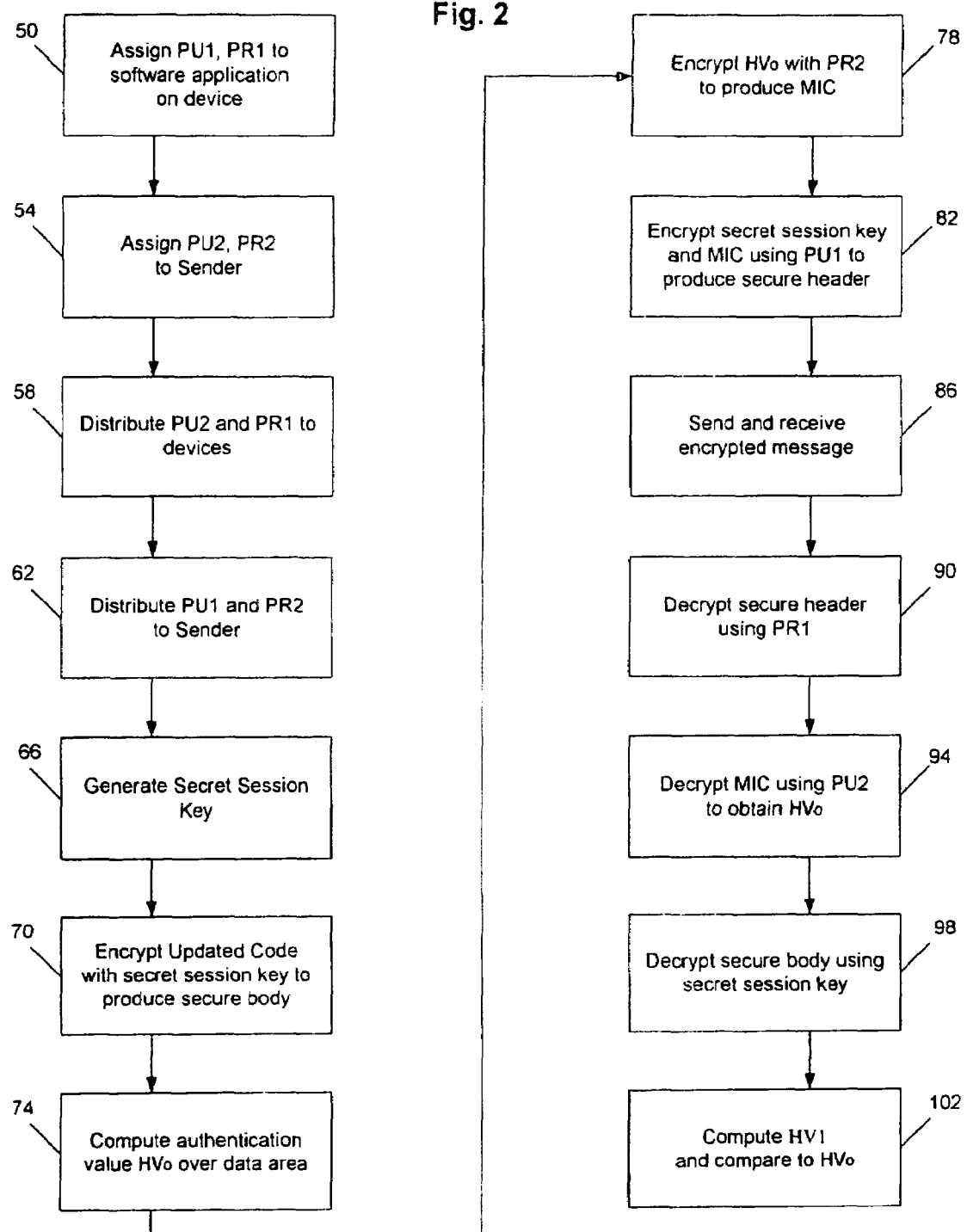

METHOD FOR CONTROLLING THE DISTRIBUTION OF SOFTWARE CODE UPDATES

FIELD OF THE INVENTION

The present invention relates generally to a method for controlling the distribution of software code updates using a semi-private key infrastructure that allows secure one-way messaging to a plurality of message recipients.

BACKGROUND OF THE INVENTION

With the advent of extensive computer networks, such as the Internet, and the increased concern for maintaining certain information confidential, various methods have been developed for the secure transmission of information. Cryptography is the science of information security and includes the study of methods to "disguise" information so that only an intended recipient can read it. For example, various encryption algorithms have been developed to encrypt a message that is in a form known as plaintext, using an encryption key, to create what is known as ciphertext, transmit the ciphertext, and allow only persons possessing an appropriate decryption key to decrypt the ciphertext to obtain the plaintext.

A symmetric encryption algorithm is one wherein the encryption key and the decryption key are the same key. In order to maintain security, this key should be made known only to the sender and the recipient of the message and kept secret.

Other methods for secure messaging have also been developed, such as public key cryptography, which is an asymmetric key scheme that uses a pair of keys including a public key and a private key. In a typical process, a public key encrypts the plaintext to create the ciphertext, and a private key decrypts the ciphertext to obtain the plaintext. In such a case, the public key can be made known to anyone, while the private key is known by a single party and kept secret. In the typical process, the recipient of the message possesses the private key. The public/private key pair is generated such that, in general, it is computationally infeasible for someone to deduce the private key from knowledge of the corresponding public key. Thus, anyone who has a public key can encrypt information using that key, but without the corresponding private key, cannot decrypt it. Only the person who has the corresponding private key can decrypt the information. Examples of well-known algorithms using public key cryptography include Diffie-Hellman, and RSA (both named for their inventors). In general, the larger the key size, the more secure the algorithm becomes. In a typical cryptography system implementing an asymmetric key scheme, keys of at least 1024 bits are used, making such systems computationally intensive.

Another important aspect of secure communication is ensuring that certain information originates from a specific entity and has not been modified. One way to accomplish this using an asymmetric key scheme is with the use of digital signatures. In particular, a digital signature enables the recipient of information to verify the authenticity of the information's origin and can also be used to assure the recipient that the information is intact. Instead of encrypting information with a public key, information is encrypted with the sender's private key. If the encrypted information can then be decrypted with a public key corresponding to the sender's private key, that proves the information originated from one with possession of the private key, i.e., presumably the sender. Again, the security of this scheme depends on keeping the private key secret. Additionally, it depends on reliably linking a public key to the party having possession of the corresponding private key, in this case, the sender of the digital signature. The reliability of the linkage can be enhanced with the use of certificates, as more fully described below.

In order to for a recipient to insure that the received information has not been modified, one-way hash functions are used. A one-way hash function mathematically operates over a data block (of any size) to produce a specific output. If the data in the data block is changed at all, even by a single bit, a different result would be produced.

PGP (Pretty Good Privacy) is a known cryptography system that incorporates a symmetric key algorithm, an asymmetric key algorithm, and the use of digital signatures. In particular, when a user wants to send a message to an intended recipient, a session key is created, which is a one-time-only, randomly generated secret symmetric key that is used to encrypt the message body (plaintext) by a selected algorithm. The use of a symmetric session key on the message body is generally simpler and faster than using a public key, due to the size of the public/private key pairs required and the computationally intensive nature of the asymmetric key algorithms. The session key itself is then encrypted using the public key corresponding to the private key of the intended recipient of the message. This public key encrypted session key is transmitted along with the encrypted message body (ciphertext) to the recipient. The recipient then uses its private key to determine the secret session key, and uses the session key to decrypt the encrypted message body to obtain the message body.

With respect to authentication and integrity of the message, a PGP system uses a hash function on the message body (or a portion thereof) to compute what is known as a message digest or hash. Then, the sender uses the sender's own private key to encrypt the message digest to create a digital signature to be sent with the encrypted message body. As described above, the recipient is able to decrypt the encrypted message body. The recipient then re-computes the message digest by using the hash function on the message body. The digital signature is decrypted using the public key corresponding to the sender's private key to yield the message digest computed by the sender. If the message digest computed by the sender is the same as the message digest recomputed by the recipient, this provides the assurance that the message is from the sender (authentication), and the message body has not been modified (integrity).

A typical application for PGP is to enable secure e-mail communication. Each party has possession of its own secret private key, with an individual public key being associated with each private key. Two-way secure communication is possible between any two parties since a private key is assigned exclusively to a single party, while the corresponding public key is made known to any party.

A public key infrastructure (PKI) is an infrastructure that allows for the secure generation and distribution of public-private key pairs for use in asymmetric cryptography systems. In particular, a PKI provides for the binding of public keys to corresponding parties with the use of certificates, wherein each certificate presents a public key of one party to one or more other parties. A certificate authority (CA) that issues the certificate digitally signs it. A certificate authority essentially checks to ensure that a specified public key does indeed belong to a specified party, and attests to that fact with a digitally signed certificate. Various levels of certificate authorities are permitted, with a top level certificate authority able to establish lower level certificate authorities, which can also attest to public key ownership through the use of certificates.

SUMMARY OF THE INVENTION

The invention provides a method for controlling the secure distribution of a software code update for an embedded software application on a device. The distribution is from a sender to a plurality of devices, wherein each device includes the software application, via a plurality of recipients. The method includes the steps of assigning an asymmetric key pair, including a public key PU1 and a private key PR1, to the software application, and assigning an asymmetric key pair, including a public key PU2 and a private key PR2, to the sender. The private key PR1 is securely distributed to the plurality of recipients, the private key PR2 is securely distributed to the sender, the public key PU1 is distributed to the sender, and the public key PU2 is distributed to the plurality of recipients. A random secret session key is generated. The software code update is encrypted using the secret session key to produce a secure body of an encrypted message. The sender computes an authentication value HV0 over a data area such as the secure body. The authentication value $HV_0$ is encrypted using the private key PR2 by the sender to produce a secure value MIC. The secret session key and the secure value MIC are encrypted using the public key PU1 by the sender to produce a secure header of the encrypted message. The encrypted message is sent and received by one or more of the recipients. The secure header is decrypted using the private key PR1 to obtain the secret session key and the secure value MIC. Another authentication value $HV_1$ is computed over the secure body. The secure value MIC is decrypted using the public key PU2 to obtain $HV_0$, and $HV_0$ is compared to $HV_1$ to verify that the encrypted message came from the sender and has not been altered. The secure body is decrypted using the secret session key to obtain the software code update.

Other features and advantages of the invention will become apparent to those skilled in the art upon review of the following detailed description, claims, and drawings.

BRIEF DESCRIPTION OF THE DRAWINGS

FIG. 2 illustrates a method for securely distributing a software code update to a plurality of devices each having an embedded software application.

DETAILED DESCRIPTION OF THE PREFERED EMBODIMENTS

Figure 1:
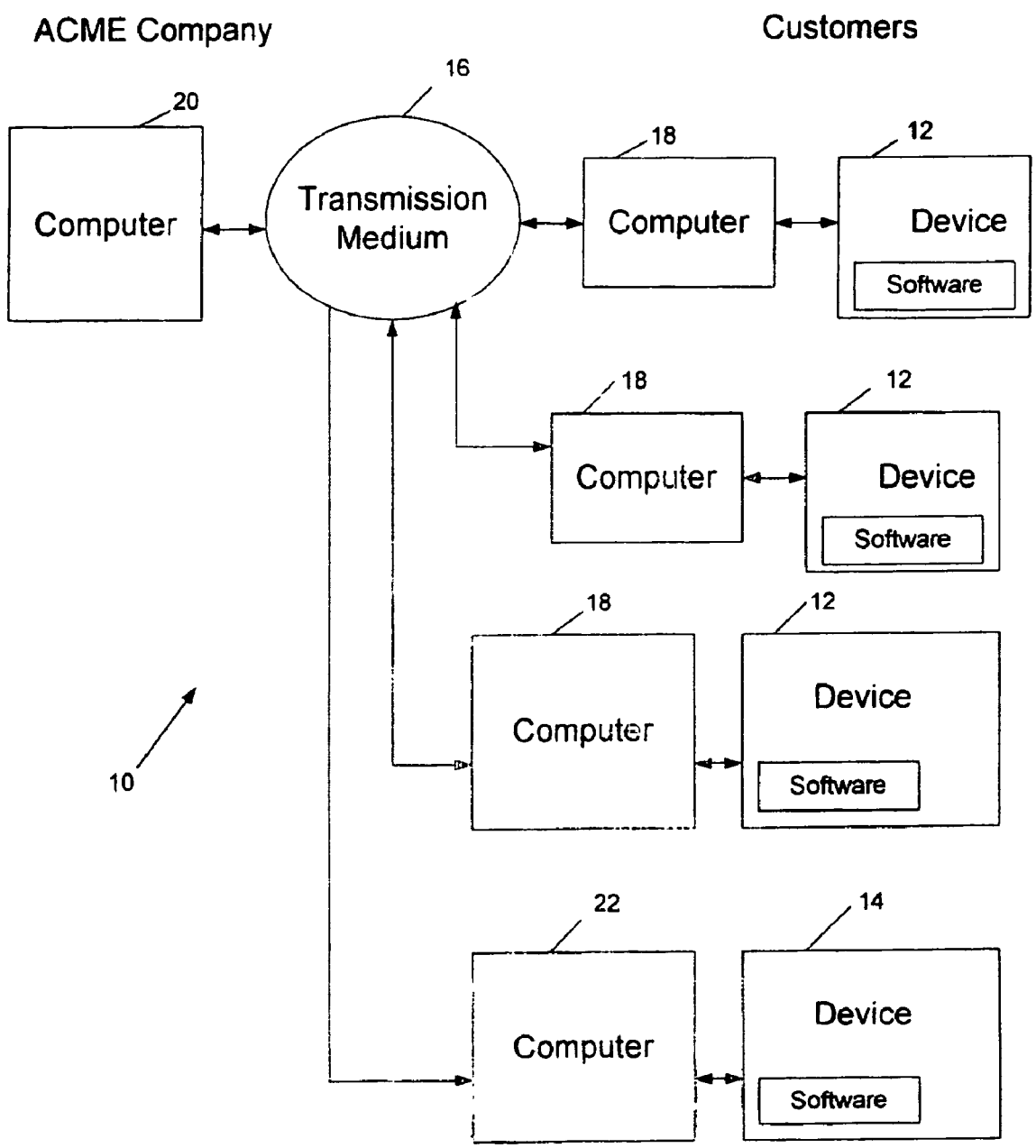
FIG. 1 illustrates one embodiment of a system for implementing a method for securely distributing a software code update.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The order of limitations specified in any method claims does not imply that the steps or acts set forth therein must be performed in that order, unless an order is explicitly set forth in the specification. In addition, it should be noted that a plurality of hardware and software-based devices, as well as a plurality of different structural components, may be utilized to implement the invention.

FIG. 1 illustrates one embodiment of a system 10 for implementing a method for controlling the distribution of an updated version of a software application from a sender to a plurality of devices. For example, Acme Company sells certain products or devices, such as device 12, to customers. Device 12 includes an embedded software application. For example, the initial code release for the software application is placed in the device at the time of manufacture. Acme Company would like to provide one or more software code updates for the software application to each customer of device 12 in a secure manner, while preventing unauthorized users and devices from receiving the updated code. Further, Acme Company would also like to provide assurances to a device 12 customer that the updated software code originates with Acme and has not been modified in any way. Acme may also sell other products, such as device 14, which also includes embedded software that requires updated code.

Other goals for the distribution of the software include ensuring that the code is for a proper device and ensuring that the code is a release level build. Further the method can easily restrict/enforce customer-specific builds and value-added enhancements.

For example, device 12 could be an ink jet printer including a software application such as a printhead alignment application. The transmission of updated software occurs through a transmission medium 16, such as the Internet. Device 12 is directly linked to the Internet or linked to a computer 18 that is linked to the Internet. Similarly, device 14 can be linked to computer 22 that is linked to the Internet. Acme also is linked to the Internet via one or more computers 20. As more fully explained with respect to FIG. 2, when Acme wants to distribute an updated version of the software application or updated code for the software application, it can encrypt the code, and send the encrypted code via the Internet to the plurality of devices 12. Devices 12 (or recipients) can decrypt the encrypted code, while entities not possessing the appropriate keys cannot decrypt the encrypted code. Although the system 10 is described with reference to the Internet as the transmission medium 16 for encrypted software code, it is to be understood that the method of the invention does not require a specific transmission medium for operation.

FIG. 2 illustrates the steps in one embodiment of a method for providing a secure one-way message between a message provider, or sender of a message, and a group of message receivers. In the embodiment described, the message itself is the software code update and perhaps additional information. The sender of the message is Acme or the developer of the software code. The devices themselves ultimately receive the software code update, although this may occur indirectly via recipients such as the owners or licensed users of the devices 12. Note that the steps in FIG. 2 do not necessarily need to be performed in the order illustrated.

In particular, at step 50, an asymmetric key pair, including a public key PU1 and a private key PR1, is assigned to the particular software application installed on device 12. At step 54, another asymmetric key pair, including a public key PU2 and a private key PR2 is assigned to the message sender. A certificate authority is established by ACME Company to generate and distribute the key pairs. In one embodiment, each individual software application is assigned its own key pair that is different than a key pair assigned to any other application. For example, software application on device 14 is different than software application on device 12, and thus has its own key pair assigned to it that is different than the key pair assigned to device 12. This allows the distribution of software code updates to be limited to a particular corresponding application. Further, as noted below, in another embodiment, each version of an individual software application is assigned its own individual key pair.

At step 58, the private key PR1 is securely distributed to the devices, or the message recipients. At step 62, the private key PR2 is securely distributed to the sender. The private keys are kept secret by the message recipients and the sender. Steps 58 and 62 also include the appropriate distribution of the public keys PU1 and PU2, respectively to the sender and the message recipients. The distribution can be accomplished with known PKI systems, and can include the use of certificates to provide a vouched—for linkage between a public key and the owner of a corresponding private key.

A message to be encrypted may be considered to be composed of two parts. There is a message body containing the actual data to be communicated, and there is a message header that may provide additional information such as any information required to process the message. For example, the message body can be the updated software code. In order to encrypt the updated software code, at step 66, a random secret session key is generated. The secret session key is then used at step 70 to encrypt the message body to produce the secure body of an encrypted message. (The message body can include other potential information in addition to the updated software.) Encrypting the message body provides data confidentiality. However, this secure messaging scheme also provides for authenticating the identity of the sender and verifying that the message body has not been modified since it left the sender.

In particular, at step 74, an authentication value $HV_0$ is computed over a data area that includes either the message body or the secure body. The data area can be the entire message body or secure body, or any portion of it. In the preferred embodiment, a known hash function operates over the entire secure body to produce $HV_0$. Calculation of the authentication value over the entire message body or the entire secure body provides assurance that the data has not been modified.

At step 78, the sender encrypts $HV_0$ with the sender's private key PR2 to produce a secure value MIC. At step 82, the sender encrypts the secret session key and the secure value MIC using the message recipients' public key PU1 to produce a secure header of the encrypted message. Other information can also be made part of the secure header, including, for example, a certificate, CERT, verifying the public key PU2 of the sender, if it has not previously been distributed and verified.

At step 86, the sender sends the encrypted message including the secure body and the secure header. One or more of the message recipients (devices) receives the encrypted message.

At step 90, the secure header is decrypted using the private key PR1 to obtain the secret session key and the secure value MIC. At step 94, the secure value MIC is decrypted using the public key PU2 to obtain the authentication value $HV_0$. At step 98, the secure body is decrypted using the secret session key to obtain the updated software code. At step 102, another authentication $HV_1$ is computed over the same data area as $HV_0$ was computed. In the preferred embodiment, this data area is the entire secure body. Next, $HV_1$ is compared to $HV_0$. If these values are the same, this provides authentication that the message came from the sender. Further, if the authentication value is computed over the entire message body or the entire secure body, this assures integrity of the message, i.e., that the message body has not been modified.

The secure nature of the described method prevents unauthorized users and devices from obtaining the updated software code, and prevents the sender from repudiation of the updated software code.

It is also possible to repeat this procedure to allow the downloading of further versions of the software code. For example, let $CR_0$ be the initial code release for a given product, with $CR_1, CR_2, \ldots, CR_j$ the subsequent versions of the code. Updating $CR_0$ to $CR_1$ requires the message containing $CR_1$ to be encrypted using the public key associated with $CR_0$. Likewise, updating to any new code release $CR_j$, requires the message to be encrypted using the public key of the immediately prior version. Note that each version can be assigned the same key pair, or each version can be assigned its own asymmetric key pair. If the key pair does not change between versions, then updated versions can be decrypted without having to download each successive version. However, if ACME decides to restrict the distribution, for example, if the something fundamental to the code has changed, this can be accomplished by changing the key pairs between versions. Once a device is upgraded with an updated version of code having a new public/private key pair, older code releases that are encrypted with the older code's public key will then be incompatible with the current private key.

Various features and advantages of the invention are set forth in the following claims.

What is claimed is:

1. A method for controlling the distribution of a software code update for an embedded software application on a device, wherein the distribution is from a sender to a plurality of devices each including the software application via a plurality of recipients, comprising:

assigning an asymmetric key pair, including a public key PU1 and a private key PR1, to the software application;

securely distributing the private key PR1 to the plurality of recipients and distributing the public key PU1 to the sender;

assigning an asymmetric key pair, including a public key PU2 and a private key PR2, to the sender;

securely distributing the private key PR2 to the sender and distributing the public key PU2 to the plurality of recipients;

generating a random secret session key;

encrypting the software code update using the secret session key by the sender to produce a secure body of an encrypted message;

computing an authentication value $HV_0$ over a data area by the sender;

encrypting $HV_0$ using the private key PR2 by the sender to produce a secure value, MIC;

encrypting the secret session key and the secure value MIC using the public key PU1 by the sender to produce a secure header of the encrypted message;

sending the encrypted message, including the secure body and the secure header;

receiving the encrypted message by one or more of the recipients;

decrypting the secure header using the private key PR1 to obtain the secret session key and the secure value MIC;

computing an authentication value $HV_1$ over the same data area;

decrypting the secure value MIC using the public key PU2 to obtain $HV_0$;

comparing the authentication value $HV_0$ to the authentication value $HV_1$ to verify that the encrypted message came from the sender and has not been altered; and decrypting the secure body using the secret session key to obtain the software code update.

2. The method of claim 1, wherein both asymmetric key pairs are assigned by a certificate authority.

3. The method of claim 2, wherein the public key PU2 is distributed to the recipients via a certificate signed by the certificate authority or an authority verified by the certificate authority.

4. The method of claim 3, wherein the sender is the certificate authority.

5. The method of claim 3, wherein the sender is an authority verified by the certificate authority.

6. The method of claim 1, wherein the authentication value $HV_0$ is computed over the entire secure body.

7. The method of claim 1, wherein the authentication value $HV_0$ is computed over a portion of the secure body.

8. The method of claim 1, wherein the data area is the entire software code update.

9. The method of claim 1, wherein the secure header of the message also includes an encrypted certificate that, when decrypted, yields the public key PU2.

10. A method for securely distributing an updated version of a software application embedded in a device, wherein the distribution occurs from a sender to a plurality of devices, wherein each device includes the software application, comprising:

assigning an asymmetric key pair, including a public key PU1 and a private key PR1, to a first version of the software application;

distributing public key PU1 to the sender, and securely distributing private key PR1 to the plurality of devices;

assigning an asymmetric key pair, including a public key PU2 and a private key PR2, to the sender;

distributing public key PU2 to the devices and securely distributing PR2 to the sender;

generating a random, symmetric secret session key;

assigning an asymmetric key pair, including a public key PU3 and a private key PR3 to a second version of the software application;

encrypting the second version of the software application and private key PR3 using the secret session key by the sender to produce a secure body of an encrypted message;

computing a hash value $HV_0$ using a hash function over the secure body by the sender;

encrypting $HV_0$ using the private key PR2 by the sender to produce a secure value MIC;

encrypting the secret session key and the secure value MIC using the PU1 key by the sender to produce a secure header of the encrypted message;

sending the encrypted message, including the secure body and the secure header;

receiving the encrypted message by one of the plurality of devices;

decrypting the secure header using the private key PR1 to obtain the secret session key and the secure value MIC;

computing a hash value $HV_1$ over the secure body;

decrypting the secure value MIC using the public key PU2 to obtain $HV_0$;

comparing the hash value $HV_0$ to the hash value $HV_1$ to verify that the encrypted message came from the sender and has not been altered;

decrypting the secure body using the secret session key to obtain the second version of the software application and private key PR3; and producing another encrypted message to distribute a third version of the software application using public key PU3, and allowing only devices having PR3 to decrypt the encrypted third version of the software.

11. The method of claim 10, wherein the asymmetric key pairs are assigned by a certificate authority.

12. The method of claim 11, wherein the public key PU2 is distributed to the devices via a certificate signed by the certificate authority or an authority verified by the certificate authority.

13. The method of claim 12, wherein the sender is the certificate authority.

14. The method of claim 12, wherein the sender is an authority verified by the certificate authority.

15. The method of claim 10, wherein the hash value $HV_0$ is computed over the entire secure body.

16. The method of claim 10, wherein the hash value $HV_0$ is computed over a portion of the secure body.

17. The method of claim 10, wherein the secure header of the message also includes an encrypted certificate, that when decrypted, yields the public key PU2.

18. A method for controlling the distribution of a message from a sender to a plurality of message group members, comprising:

assigning an asymmetric key pair, including a public key PU1 and a private key PR1, to the message group members;

assigning an asymmetric key pair, including a public key PU2 and a private key PR2 to the sender of the message;

distributing the public key PU2 to the sender and securely distributing the private key PR1 to the message group members;

distributing the public key PU1 to the message group members and securely distributing the private key PR2 to the sender;

generating a random secret session key;

encrypting the message using the secret session key by the sender to produce a secure body of an encrypted message;

computing an authentication value $HV_0$ over the secure body by the sender;

encrypting $HV_0$ using the private key PR2 by the sender to produce a secure value MIC;

encrypting the secret session key and the secure value MIC using the public key PU1 by the sender to produce a secure header of the encrypted message;

sending the encrypted message, including the secure body and the secure header;

receiving the encrypted message;

decrypting the secure header using the private key PR1 by any message group member to obtain the secret session key and the secure value MIC;

computing an authentication value $HV_1$ over the secure body by any message group member;

decrypting the secure value MIC using the public key PU2 by any message group member to obtain $HV_0$;

comparing the authentication value $HV_0$ to the authentication value $HV_1$ to verify that the encrypted message came from the sender and has not been altered; and decrypting the secure body using the secret session key to obtain the message.

* * * * *